May 4, 1937.                J. A. WALSH                2,079,091
                         PNEUMATIC TIRE CASING
                  Filed April 6, 1935        2 Sheets-Sheet 1
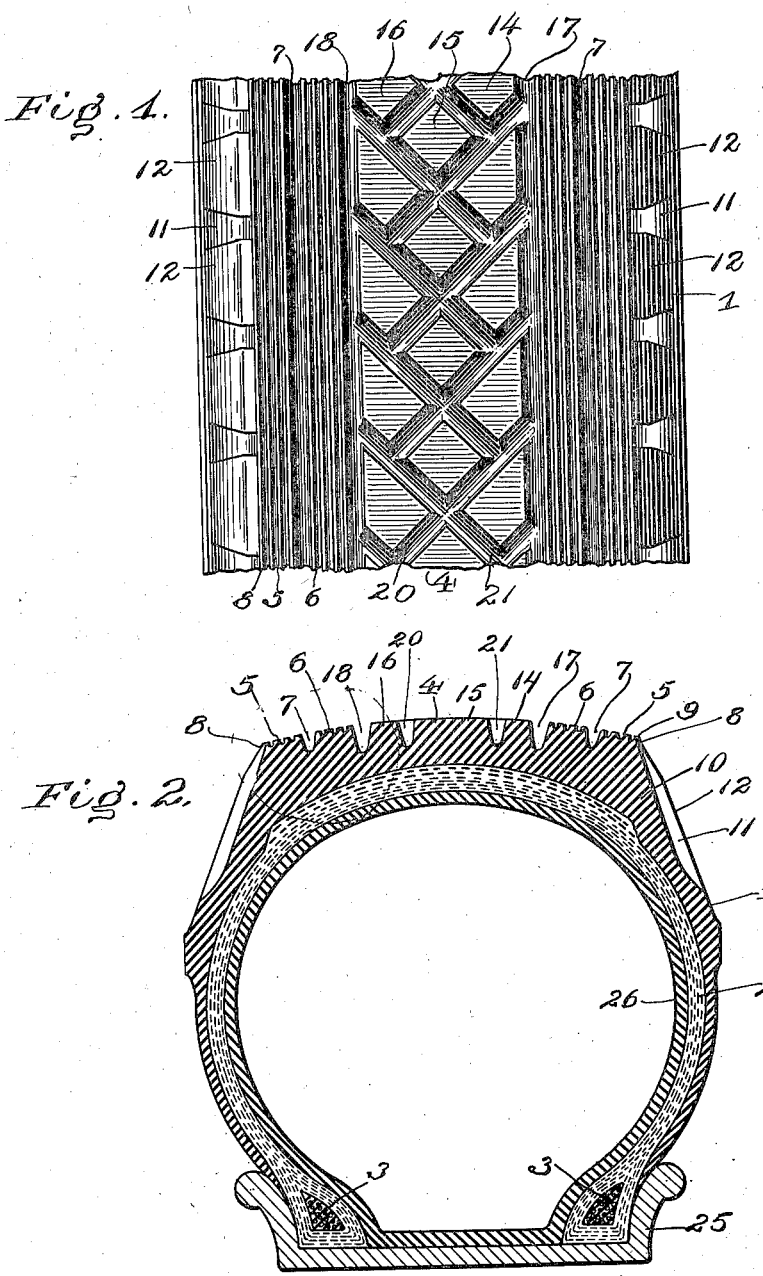
INVENTOR.
James A. Walsh
BY
Morrison, Kennedy, & Campbell
ATTORNEYS.

May 4, 1937.    J. A. WALSH    2,079,091
PNEUMATIC TIRE CASING
Filed April 6, 1935    2 Sheets-Sheet 2
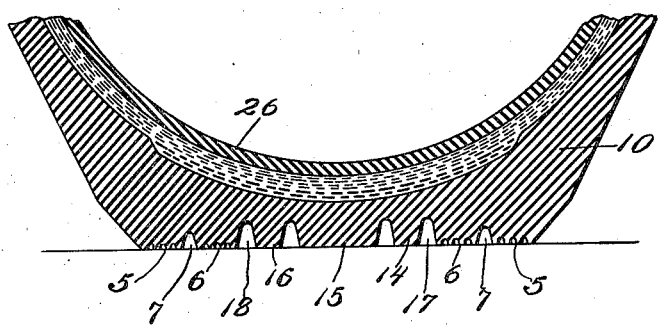
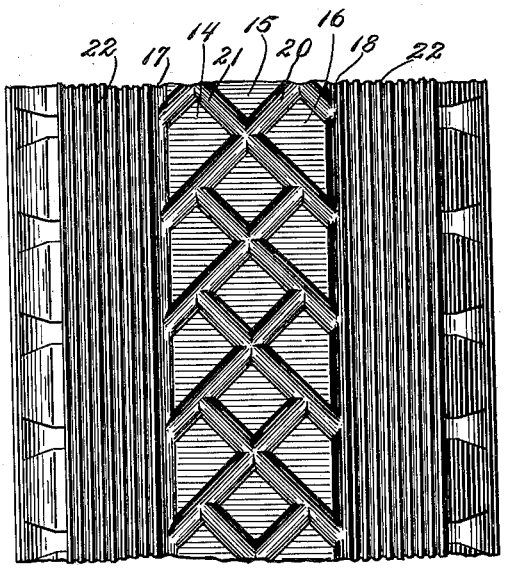
INVENTOR.
James A. Walsh
BY
Morrison, Kennedy & Campbell
ATTORNEYS.

Patented May 4, 1937

2,079,091

UNITED STATES PATENT OFFICE 2,079,091

PNEUMATIC TIRE CASING

James A. Walsh, West Haven, Conn., assignor to The Armstrong Rubber Company, Inc., a corporation of New Jersey Application April 6, 1935, Serial No. 15,034

8 Claims. (Cl. 152—14)

This invention relates to pneumatic tire casings, and particularly to tire casings of the so-called "balloon" type i. e. tire casings designed for low inflation pressure and which have a greater deflection under given loads than the old high pressure tire casings.

Many difficulties have been encountered in the transition from the high pressure tire to the low pressure tire, for although fundamentally there would seem to be very little difference between the two, nevertheless there exist vital distinctions both structurally and functionally. For example, as between a high pressure tire of given load capacity and a low pressure tire of equal capacity, the latter is of much greater cross-sectional area, has smaller inside and outside diameters adapting it to a smaller wheel, a wider traction surface due to its greater deflection resulting from lower inflation pressure, and other points of distinction well known to those skilled in the art.

The advantages of the low pressure tire over the high pressure tire are well known and need not be elaborated upon, although some of them will be referred to hereinafter, yet many of the advantages, if not all, have been gained at the expense of other important and desirable features of good tire design.

The tread of the tire has presented perhaps the most serious difficulty. The low pressure tire has a larger so-called "footprint" or surface contact area than a high pressure tire of equal capacity and, hence, a greater traction surface. From the standpoint of traction, this is, of course, desirable but the added resistance of the tire to movement is not. Moreover, the greater traction surface increases the friction between the tire and the road surface, giving rise to the development of higher temperature and overheating of the tire when traveling at high speed.

As already stated, the low pressure tire is adapted for wheels of small diameter, thus giving rise to a lower center of gravity of the vehicle on which it is employed and to some extent compensating for the loss of power due to its increased traction. But its smaller outside diameter increases the number of revolutions of the tire per mile over that of the larger high pressure tire, effecting more rapid wear and, in conjunction with its increased traction, developing a more intense frictional heat at a given mile per hour speed.

Another troublesome feature is that of flexibility of the tire tread. The more flexible the tread is the more pronounced is the circumferential traction wave set up, accentuating the noise and vibration which it produces. It also exaggerates the heel and toe action of the anti-skid buttons or protuberances, thus effecting rapid and uneven wear of the tread. Furthermore, the side rolling of the tire is greater, causing severe chafing and rapid wear at the edges of the tread, so that the tread assumes a more and more rounded transverse contour. This is particularly true of tires with anti-skid buttons located at the side edges of the tread.

The foregoing difficulties have been set forth briefly to present some of the important problems with which the tire designer is confronted. Many attempts have been made to obviate various of the difficulties, but the different tread designs created are directed only to one or some of the objectionable features and usually at the expense of desirable features, as previously stated.

It is the object of the present invention to design the tread of a low pressure tire so as to obviate the foregoing and other objectionable features without sacrificing its desirable features. To this end, specifically, the tread is formed with continuous load bearing circumferential raised ribs located at its side edges and with an anti-skid portion comprising intersticed elements arranged only intermediate the ribs and having no connection therewith. Preferably, a pair of spaced ribs is located at each side of the tread and their total width is substantially equal to half the width of the tread, or in other words, substantially equal to the width of the anti-skid portion of the tread. The anti-skid portion is comprised of buttons or protuberances of a plurality of sizes and shapes and having no connection with the ribs or with one another, being spaced from the ribs by circumferential grooves and from each other by oblique transverse grooves all of equal depth. The raised ribs and anti-skid buttons are of substantially the same height to form a flat tread and the rib or pair or ribs at the sides thereof are located each in the region of a circumferential plane passing through the tire bead located on the same side of the tire.

In the accompanying drawings, the invention has been shown merely by way of example and in preferred form, and obviously many variations and modifications thereof may be made without departing from the spirit and scope of the invention. It is to be understood, therefore, that the invention is not limited to any specific form or embodiment, except insofar as such limitations appear in the appended claims.

Referring to the drawings:

Fig. 1 is a plan view of a fragment of a low pressure tire casing, showing a preferred embodiment of the invention;

Fig. 2 is a cross-sectional elevation of the tire casing shown in Fig. 1;

Fig. 3 is a fragmentary cross-sectional elevation, showing the tread as it appears under load; and Fig. 4 is a view similar to Fig. 1, showing a modified form of tire tread.

Referring particularly to Figs. 1, 2 and 3, the tire casing 1 comprises a body portion 2 and beads 3, of any suitable construction in accordance with standard commercial practice, and a tread portion 4, it being noted, however, that the casing is formed so that the width of the traction surface of the tread is substantially equal to the distance between the outside edges of the beads 3 when the tire is mounted on the wheel rim 25 and inflated by the inner tube 26.

The tread portion 4 has a substantially flat traction surface and comprises a pair of continuous circumferential raised ribs 5 and 6 of equal width, located at each side of the tread and spaced apart by a circumferential groove 7. The outer sides 8 of the ribs 5 meet the traction surface 9 at a sharp angle and extend radially inwardly, merging with the unbroken substratum 10 of the tread which gradually becomes thinner as it continues along the side wall of the body 2, as shown in Fig. 2. In each side face of the tread 4 there are formed recesses 11 (see dotted lines Fig. 2) extending radially inwardly from the traction surface 9 of the ribs 5 and which define between them a series of radially extending ribs 12 adapted to resist wear due to scraping along a curb or when traveling over rutted roads or the like.

The entire anti-skid portion (excluding the anti-skid functioning of the ribs 5 and 6) is located intermediate the inner ribs 6 (Fig. 2) and comprises three circumferential series of buttons or protuberances 14, 15 and 16. The central series of buttons 15 are square and of equal size, arranged so that their side edges are angularly disposed with relation to a central plane passing through the tread. The buttons 14 and 16, on the other hand, which correspond in size and shape and are arranged on opposite sides of the series of buttons 15, have no two sides of equal length. These anti-skid buttons 14, 15 and 16 have no connection with the ribs 5 and 6 or with one another, being spaced from the inner ribs 6 by circumferential grooves 17 and 18 and from one another by obliquely disposed grooves 20 and 21, the grooves 17, 18, 20 and 21 all being of equal width and depth and wider and deeper than the grooves 7 separating the ribs 5 and 6. Although the grooves 17, 18, 20 and 21 are intercommunicating, it will be noted that the arrangement of the buttons 14, 15 and 16 is such that there is no direct or straight line communication between the circumferential grooves 17 and 18. The oblique grooves 20 extend in a straight line from the groove 17 across the tread to an extent of more than half the width of the anti-skid area, but terminate short of the circumferential groove 18. In like manner, the oblique grooves 21 extend from the groove 18 toward the groove 17 but terminate short thereof. The grooves 20 and 21, however, cross one another and, hence, form an indirect communication between the circumferential grooves 17 and 18, producing a network of communicating passages throughout the anti-skid portion of the tread.

A modified form of the tread design is shown in Fig. 4, the difference being that a single wide rib 22 is formed at each side of the tread 4, each rib 22 presenting substantially the same amount of traction surface as a pair of the ribs 5 and 6. Although the single ribbed tire is adaptable to the same uses as the double ribbed tire, it presents a tread somewhat more inflexible at the shoulders or load bearing portion and, therefore, is better adapted for heavy duty as a truck or bus tire.

It will be observed, that the improved tread presents two distinct areas each having a particular function. The pairs of ribs 5 and 6 at opposite sides of the tread are adapted primarily to support the major portion of the load, while the central portion of the tread, comprising the anti-skid buttons 14, 15 and 16, is relatively more flexible and intended to function mainly in presenting the anti-skid and traction surface of the tread. The resistance offered by the tire due to traction is much less than it would be if the anti-skid area extended over the entire width of the tread, yet the desired amount of traction is obtained. Also, frictional heat is minimized so that it does not seriously affect the tread and the wide, deep inter-communicating grooves 17, 18, 20 and 21 permit the free circulation of air in contact with a large area of exposed tread surface without any opportunity for it to become pocketed. The indirect communication between the circumferential grooves 17 and 18 serves to prevent a rush of air in a straight line across the anti-skid area and thus forces the air in different directions to set up conflicting air currents further to obviate the presence of still air in any of the grooves.

The greater flexibility of the central or anti-skid portion of the tread insures a flat running of the tread and distribution of the load over the entire width of the ribs 5 and 6 so that they will wear evenly, this load distribution being brought about further by the spacing of the ribs which gives them the flexibility to flatten and spread out under load, but because of the relative shallowness of the grooves 7 the ribs do not flatten to such extent as to shift the load in any appreciable amount to the more flexible central portion of the tread. Although the tread as a whole is very flexible, the rigidity of the ribs prevents undue compression of the tread over its entire width as it contacts the road surface during rotation, thus minimizing the traction wave which is set up and the consequent noise and vibration produced as well as the heel and toe action on the anti-skid protuberances 14, 15 and 16, which, as heretofore stated, produces rapid and uneven wear of the tread. Another, and very important feature, is that the tread wears flat for, although its flexibility and low inflation pressure permit the tire to roll side-wise, there is no surface contacting tread area outside the ribs 5 and, hence, the rolling of the tire merely shifts some of the load from one pair of ribs to the other depending upon the direction of the roll and severe chafing and wearing is avoided.

In short, the improved tread design secures to the low pressure tire its desirable features and yet embodies the desirable features of good tire design. It resists rapid and uneven wear to preserve its original flat traction surface and has adequate anti-skid qualities without added resistance to movement. It is flexible and shock-absorbing yet rigid enough to prevent undue compression under load and the resulting objectionable features. Moreover, although rugged and durable, its design obviates the heavy, cumbersome and bulging appearance of the low pressure tire.

The single ribbed tire casing shown in Fig. 4 embodies the desirable characteristics of the double ribbed tire but, as stated, is somewhat more rigid at its edges because of the wider ribs 22 and therefore better adapted for heavy duty.

There are different types of low pressure tires, differing particularly in size, shape, inflation pressure capacity and percentage of deflection; but the present invention applies equally well to them all. The "regular passenger balloon" tire has a deflection of about 16% and, as between the different types of tires, the percentage of deflection increases as the inflation pressure decreases, so that the desirable and undesirable characteristics flowing from lower inflation pressure are present to a higher degree as benefits or detriments, as the case may be. The improved tread design herein disclosed, however, brings out the desirable features incident to the lower inflation pressure and obviates the undesirable features regardless of the type of the low pressure tire to which it is applied.

Having thus described my invention, what I claim is:

1. In a tire casing having a deflection of 16% or more, a tread portion comprising circumferential raised traction ribs and a plurality of circumferentially extending series of intersticed anti-skid elements, the ribs being arranged only at the side edges of the tread and presenting the load bearing portion of the tread and the anti-skid elements being arranged only intermediate the ribs and presenting the remaining portion of the tread area.

2. A tire casing as in claim 1, wherein a pair of ribs is arranged at each side edge of the tread.

3. A tire casing as in claim 1, wherein each rib lies substantially in a circumferential plane passing through the tire bead on the corresponding side of the tire.

4. A tire casing as in claim 1, wherein each rib lies substantially in a circumferential plane passing through the tire bead on the corresponding side of the tire, and characterized by the fact that the traction surface of the tread is substantially flat and extends only from the outer edge of the rib at one side of the tread to the outer edge of the rib at the opposite side of the tread.

5. In a tire casing having a deflection of 16% or more, a tread portion comprising circumferential raised traction ribs having a total width substantially equal to one half the width of the tread and a plurality of circumferentially extending series of intersticed anti-skid elements, the ribs being arranged only at the side edges of the tread and the anti-skid elements being arranged only intermediate the ribs and having no connection therewith, whereby to form a flexible central anti-skid area substantially equal to one half of the tread area and a relatively more rigid load bearing area at the shoulders presenting the remaining tread area.

6. In a tire casing having a deflection of 16% or more, a tread portion comprising circumferential raised traction ribs having a total width substantially equal to one half the width of the tread and presenting the load bearing portion thereof and a plurality of circumferentially extending series of intersticed anti-skid elements presenting the remaining portion of the tread, the ribs being arranged only at the side edges of the tread and the anti-skid elements being arranged only intermediate the ribs and having no connection therewith or with one another.

7. In a tire casing having a deflection of 16% or more, a tread portion comprising circumferential raised traction ribs having a total width substantially equal to one half the width of the tread and presenting the load bearing portion thereof and a plurality of circumferentially extending series of intersticed anti-skid elements of a plurality of different sizes and shapes presenting the remaining portion of the tread, the ribs being arranged only at the side edges of the tread and the anti-skid elements being arranged only intermediate the ribs.

8. In a tire casing having a deflection of 16% or more, a tread portion comprising circumferential raised traction ribs having a total width substantially equal to one half the width of the tread and presenting the load bearing portion thereof and a plurality of circumferentially extending series of intersticed anti-skid elements of a plurality of different sizes and shapes presenting the remaining portion of the tread, the ribs being arranged only at the side edges of the tread and the anti-skid elements being arranged only intermediate the ribs and being equally spaced from said ribs and from one another.

JAMES A. WALSH.